US010536446B2

(12) United States Patent
Miran et al.

(10) Patent No.: US 10,536,446 B2
(45) Date of Patent: Jan. 14, 2020

(54) SINGLE AUTHENTICATION TO A MULTI-TENANCY SINGLE-PAGE CLOUD APPLICATION

(71) Applicant: Microsoft Technology Licensing, LLC., Redmond, WA (US)

(72) Inventors: Yarin Miran, Rishon LeZion (IL); Nir Mardiks, Bellevue, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 288 days.

(21) Appl. No.: 15/589,111

(22) Filed: May 8, 2017

(65) Prior Publication Data

US 2018/0219854 A1   Aug. 2, 2018

Related U.S. Application Data

(60) Provisional application No. 62/452,762, filed on Jan. 31, 2017.

(51) Int. Cl.
*H04L 29/06* (2006.01)
*H04L 29/08* (2006.01)

(52) U.S. Cl.
CPC ........ *H04L 63/0815* (2013.01); *H04L 63/168* (2013.01); *H04L 67/2838* (2013.01)

(58) Field of Classification Search
CPC ....................... H04L 63/0815; H04L 67/2838; H04L 63/168
See application file for complete search history.

(56) References Cited

U.S. PATENT DOCUMENTS

| 8,769,701 B2 | 7/2014 | Hinton et al. |
| 9,325,632 B2 | 4/2016 | Banatwala et al. |
| 9,342,353 B2 | 5/2016 | Cherel et al. |

(Continued)

FOREIGN PATENT DOCUMENTS

| EP | 2926251 A1 | 10/2015 |
| WO | 2016137397 A2 | 9/2016 |

OTHER PUBLICATIONS

"Single Sign on (SSO) for Multi-Tenant Deployments", https://docs.appspace.com/appspace/5.5/admin/appspace/security-and-authentication/sso-multi-tenant/, Published on: Jun. 10, 2015, 25 pages.

(Continued)

*Primary Examiner* — Michael Pyzocha
(74) *Attorney, Agent, or Firm* — M&B IP Analysts, LLC.

(57) ABSTRACT

A system and method for single authentication to a multi-tenancy single-page application hosted in a plurality of different datacenters. The method comprises: receiving, from a client device, a login request to access the single-page application; receiving an access token in response to an authentication of a user of the client device, wherein the access token designates at least tenant identification data; determining a datacenter of the plurality of different datacenters executing an instance of the single-page application supporting a tenant of the authenticated user; retrieving, from the determined datacenter, a single web page of the single-page application, wherein the retrieved signal web page includes at least references to resources pointing to a location of the determined datacenter; and serving the web single page to the client device.

19 Claims, 5 Drawing Sheets

(56) References Cited

U.S. PATENT DOCUMENTS

| | | | |
|---|---|---|---|
| 9,361,080 B2 | 6/2016 | Das et al. | |
| 9,369,456 B2 | 6/2016 | Singh | |
| 9,542,546 B2 | 1/2017 | Wallis et al. | |
| 9,781,000 B1* | 10/2017 | Kumar | H04L 41/0813 |
| 2012/0096271 A1 | 4/2012 | Ramarathinam et al. | |
| 2013/0061047 A1* | 3/2013 | Sridharan | H04L 45/586 |
| | | | 713/162 |
| 2013/0340062 A1* | 12/2013 | Kobayashi | H04L 63/0815 |
| | | | 726/8 |
| 2014/0090037 A1* | 3/2014 | Singh | H04L 63/0815 |
| | | | 726/7 |
| 2014/0330869 A1 | 11/2014 | Factor et al. | |
| 2015/0007263 A1 | 1/2015 | Stewart et al. | |
| 2015/0188779 A1* | 7/2015 | McCanne | H04L 63/10 |
| | | | 709/203 |
| 2015/0188900 A1 | 7/2015 | Charbonneau et al. | |
| 2016/0028833 A1* | 1/2016 | Georgieva | H04L 67/146 |
| | | | 709/228 |
| 2016/0105488 A1* | 4/2016 | Thakkar | H04L 67/10 |
| | | | 709/217 |
| 2016/0261684 A1* | 9/2016 | Khalaf | H04L 67/1002 |
| 2017/0063630 A1* | 3/2017 | Olmsted-Thompson | H04L 41/042 |
| 2017/0353444 A1* | 12/2017 | Karangutkar | H04L 63/0815 |
| 2018/0075231 A1* | 3/2018 | Subramanian | G06F 21/41 |
| 2018/0081668 A1* | 3/2018 | Eberlein | G06F 8/70 |
| 2018/0159856 A1* | 6/2018 | Gujarathi | H04L 63/0281 |

OTHER PUBLICATIONS

Dzimchuk, Andrei, "Enabling multitenant support in you Azure AD protected applications", https://dzimchuk.net/enabling-multitenant-support-in-you-azure-ad-protected-applications/, Published on: Aug. 11, 2016, 7 pages.

"International Search Report and Written Opinion Issued in PCT Application No. PCT/US2017/068066", dated Feb. 27, 2018, 12 pages.

* cited by examiner

SINGLE AUTHENTICATION TO A MULTI-TENANCY SINGLE-PAGE CLOUD APPLICATION

CROSS-REFERENCE TO RELATED APPLICATIONS

This application claims priority from US Provisional Patent Application No. 62/452,762 filed on Jan. 31, 2017 which is hereby incorporated by reference for all that it contains.

BACKGROUND

In recent years, an increasing number of providers have been offering the ability to create computing environments in the cloud. For example, in 2006, Amazon Web Services™ (also known as AWS) launched a service that provides users with the ability to configure an entire environment tailored to an application executed over a cloud-computing platform. In general, such services allow for developing scalable applications in which computing resources are utilized to support efficient execution of the application.

Organizations and businesses that develop, provide, or otherwise maintain cloud-applications have become accustomed to relying on these services and implementing various types of environments, from complex websites to applications and services provided via the software-as-a-service (SaaS) delivery model. Such services and applications are collectively referred to as "cloud applications." Cloud applications are typically accessed by users using a client device via a web browser.

Cloud applications are typically programmed to support multi-tenancy access or resource sharing. A multi-tenancy is an architecture in which a single instance of a software application (e.g., a cloud-application) serves multiple customers, where a customer is a tenant. Tenants may customize some resources of the application, such as color of the user interface (UI) or business rules, but they cannot customize the application's code.

To allow scalability and low latency in cloud applications supporting multi-tenancy architecture, instances of the same application are hosted in multiple datacenters. Further, tenants (or their data) reside in different datacenters. The datacenters are geographically distributed. Typically, a datacenter would serve clients in its geographic location. For example, clients from Europe would access a cloud application hosted in a datacenter located in Germany.

Currently, there are two techniques allowing a client device to communicate or otherwise access the datacenter supporting its tenant. These techniques are based on URL-redirection and forward proxy, and are further described herein below with reference to FIG. 1.

Figure 1:
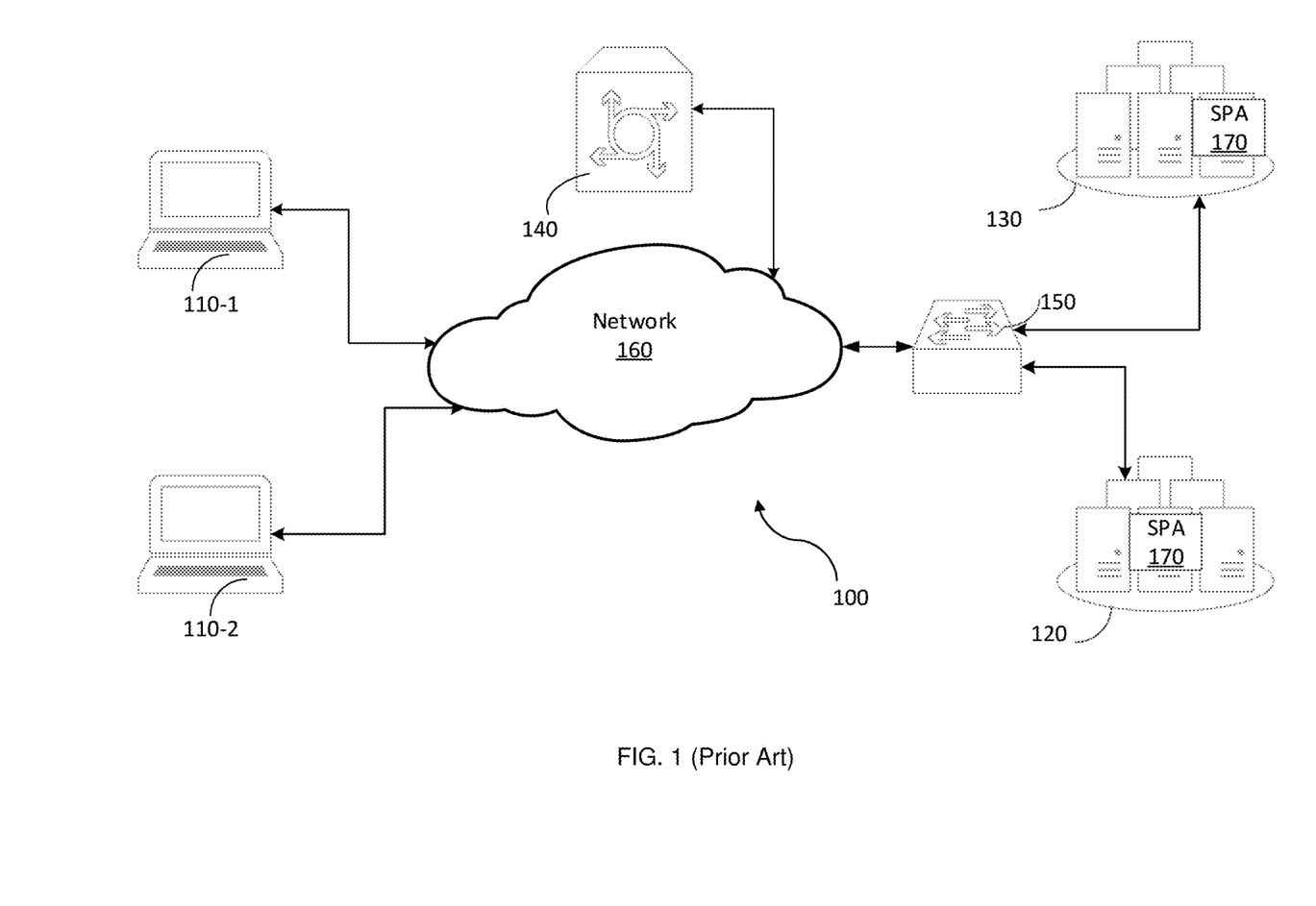
FIG. 1 is a network diagram utilized to describe current techniques for directing client devices to datacenters.

The example network 100 illustrated in FIG. 1 includes client devices 110-1 and 110-2, datacenters 120 and 130, a single-sign-on (SSO) server 140, and a proxy 150, communicatively connected through a network 160. Each of the datacenters 120 and 130 hosts a single-page application (SPA) 170 that supports a multi-tenancy architecture.

In SPAs, a single HTML page is loaded to a browser of a client device and is dynamically updated as the user interacts with the application. Typically, the single web page includes all necessary code (e.g., HTML, JavaScript, and CSS) to be rendered on the browser. Interaction with the server hosting a single-page application is performed using protocols, such as AJAX and HTML5, to create responsive web applications without constant page reloads.

When redirecting a client device to access the datacenter supporting its tenant, upon authentication of a user of the client device 110-1, for example by means of the single-sign-on (SSO) server 140, the client device 110-1 is redirected to a datacenter, e.g., the datacenter 120. The redirection is performed by returning, to the client device 110-1, a URL (a redirected URL) of the datacenter 120 hosting the application's tenant associated with a user of the client device 110-1. The redirected URL is displayed on the browser of the client device 110-1, thereby exposing the URL of the datacenter. For example, if the client device 110-1 initially accesses a URL portal.myapp.com and the datacenter serving the client is in Europe, the URL returned by the SSO server 140 may be europe_site.portal.myapp.com. Forcing a redirect of the request would require issuing a new server certificates per datacenter supporting the modified URL.

Another technique for directing a client device to a datacenter supporting its tenant is using a proxy 150. The proxy 150 is configured to receive requests from the client devices 110-1 and 110-2, and to forward the received requests to a datacenter serving a particular client's tenant. For example, requests received from the client device 110-1 to an application addressed by portal.myapp.com can be directed to the datacenter 120, while requests received from the client device 110-2 to the same URL can be directed to the datacenter 130. The association between datacenters and client devices can be preconfigured in the proxy 150. The proxy 150 is typically a reverse proxy.

Using a reverse proxy complicates the solution, as use of the proxy requires additional hardware resources to be deployed in the network, increasing latency by forcing another hop for the traffic, and maintaining, by a reverse proxy, a current database on the association between datacenters to client devices.

As greater reliance is made on cloud applications, the access to such applications from a web browser must be completely secured, without latency, and must further be seamless.

It would therefore be advantageous to provide a solution that would overcome the deficiencies noted above by allowing seamless access to datacenters hosting cloud applications supporting multi-tenancy.

SUMMARY

This Summary is provided to introduce a selection of concepts in a simplified form that are further described below in the Detailed Description. This Summary is not intended to identify key features or essential features of the claimed embodiments, nor is it intended to be used to limit the scope of the various claimed embodiments. Moreover, the sole purpose of this Summary is to present some concepts of one or more embodiments in a simplified form as a prelude to the more detailed description that is presented later. For convenience, the term "some embodiments" or "various embodiments" may be used herein to refer to a single embodiment or multiple embodiments of the disclosure.

Some embodiments disclosed herein include a method for single authentication to a multi-tenancy single-page application hosted in a plurality of different datacenters. The method comprises: receiving, from a client device, a login request to access the single-page application; receiving an access token in response to an authentication of a user of the client device, wherein the access token designates at least tenant identification data; determining a datacenter of the plurality of different datacenters executing an instance of the single-page application supporting a tenant of the authenticated user; retrieving, from the determined datacenter, a single web page of the single-page application, wherein the retrieved single web page includes at least references to resources pointing to a location of the determined datacenter; and serving the single web page to the client device.

Some embodiments disclosed herein also include a non-transitory computer readable medium having stored thereon instructions for causing a processing circuitry to execute a process, the process comprising: receiving, from a client device, a login request to access the single-page application; receiving an access token in response to an authentication of a user of the client device, wherein the access token designates at least tenant identification data; determining a datacenter of the plurality of different datacenters executing an instance of the single-page application supporting a tenant of the authenticated user; retrieving, from the determined datacenter, a single web page of the single-page application, wherein the retrieved single web page includes at least references to resources pointing to a location of the determined datacenter; and serving the single web page to the client device.

Some embodiments disclosed herein also include a system for single authentication to a multi-tenancy single-page application hosted in a plurality of different datacenters. The system comprises: a processing circuitry; and a memory, the memory containing instructions that, when executed by the processing circuitry, configure the system to: receive, from a client device, a login request to access the single-page application; receive an access token in response to an authentication of a user of the client device, wherein the access token designates at least tenant identification data; determine a datacenter of the plurality of different datacenters executing an instance of the single-page application supporting a tenant of the authenticated user; retrieve, from the determined datacenter, a single web page of the single-page application, wherein the web page includes at least references to resources pointing to a location of the determined datacenter; and serve the single web page to the client device.

BRIEF DESCRIPTION OF THE DRAWINGS

The subject matter disclosed herein is particularly pointed out and distinctly claimed in the claims at the conclusion of the specification. The foregoing and other objects, features and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

By way of example and without limitation, a system and method for single authentication to a multi-tenancy single-page application (SPA) hosted in multiple different datacenters are provided. Some example embodiments include receiving, from a client device, a login request to access a SPA. An authentication of a user of the client device is performed using, for example, a SSO server. Upon authentication of the user, an access token is received. The access token includes at least a tenant identifier (ID). Based on the tenant ID, a datacenter executing an instance of the SPA supporting a tenant designated by the tenant ID is determined. A web page of the cloud application is retrieved from the determined datacenter. The web page includes at least resources pointing to a location of the determined datacenter. The retrieved web page is served to the client device. The various embodiments will be described in greater detail below.

Figure 2A:
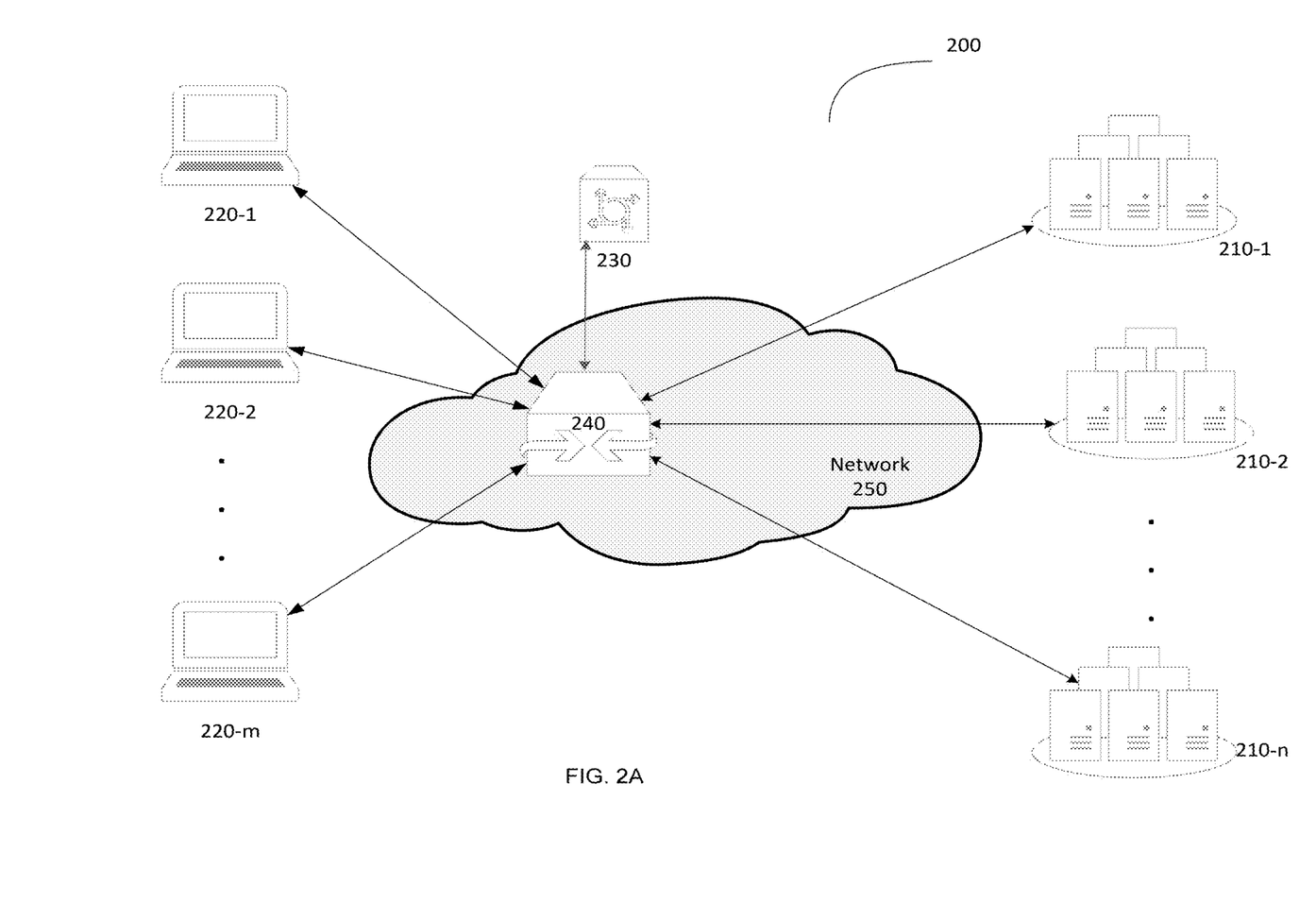
FIG. 2A is a network diagram utilized to describe the various disclosed embodiments.
Figure 2B:
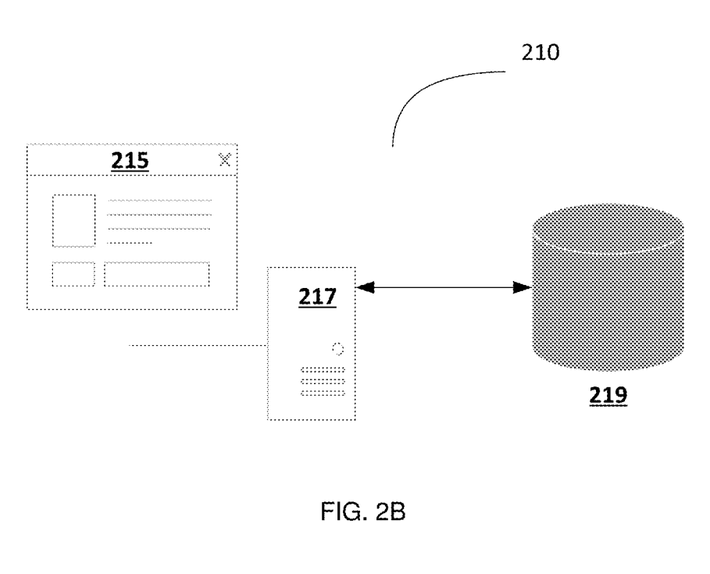
FIG. 2B is a schematic diagram of a datacenter illustrated in FIG. 2A.

FIG. 2A is an example network diagram of a communication system 200 utilized to describe the various disclosed embodiments. FIG. 2B is an example diagram of a datacenter 210. The following discussion will be made with reference to FIGS. 2A and 2B.

The system 200 includes a plurality of datacenters 210-1 through 210-*n* (where n is an integer greater than 1), a plurality of client devices 220-1 through 220-*m* (where m is an integer greater than 1), a single-sign-on (SSO) server 230, and an authentication gateway 240 communicatively connected through a network 250.

The datacenters 210 can be part of a cloud computing platform which may be a private cloud, a public cloud, or a hybrid cloud providing computing resources to applications or services executed therein. It should be noted that different datacenters 210 can be deployed in different cloud computing platforms. As illustrated in the example FIG. 2B, an instance of a SPA 215 is executed in a datacenter 210 by a server 217.

In SPAs, a single HTML page is loaded to a browser of a client device 220 and is dynamically updated as a user interacts with a SPA. Typically, the loaded single web page includes all necessary resources (e.g., HTML, JavaScript, and CSS) to be rendered on the browser. Interaction between a browser of a client device 220 and a server 217 hosting the SPA 215 is performed using protocols, such as AJAX and HTML5. For example, XMLHttpRequest (XHR) requests are sent from client devices 220 to the server 217 to retrieve resources of the SPA 215.

The SPA 215 may provide functionality of a web application, a cloud application, and the like, and be designed as an e-commerce application, a collaboration application, an office and messaging application, a social media application, an enterprise application, a gaming application, a media sharing application, and the like. The server 217 may be an application server, a web server, and the like, and can be realized as a virtual machine or a physical machine.

In an embodiment, the SPA 215 supports multi-tenancy. That is, an instance of the SPA 215 executed in the datacenter 210 can serve a group of tenants. To this end, in a typical deployment, the server 217 is communicatively connected to at least one shared resource 219. For example, the shared resource 219 may be a database configured to maintain data belonging to a plurality of different tenants.

Different client devices 220 are operable by users associated with different tenants, each of which can use an instance of the SPA 215 and access the shared resource (not shown) only in a datacenter designated to serve them. As an example, a user of the client device 220-1 may be part of a tenant A while a user of the client device 220-2 may be part of a tenant B. The client device 220-1 can access the SPA's instance 215 in the datacenter 210-1, while the client device 220-2 can access the SPA's instance 215 in the datacenter 210-2. It should be noted that two or more tenants can be hosted in the same datacenter and all users (through their respective client devices) can access the shared resource and application in that datacenter. For example, if the datacenter 210-*n* hosts both tenants A and B, then both client devices 220-1 and 220-2 would be served by the datacenter 210-*n*. Typically, each tenant is identified by a unique tenant identifier (ID).

Each client device 220 may include, for example, a personal computer, a laptop, a tablet computer, a smartphone, a wearable computing device, or any other computing device. The network 250 may be a wired or wireless network, a wide area network (WAN), a local area network (LAN), the Internet, and the like.

The SSO server 230 is a multi-tenant active directory that provides SSO services to all SPAs hosted in the datacenters 210. In an embodiment, the SSO server 230 maintains a list of authorized users that can access the SPAs. The list also includes, for each user (or a user's client device 210), a tenant (designated by a tenant ID) that the user belongs to.

In an embodiment, the SSO server 230 is configured to perform identity management, i.e., authentication and authorization actions. This includes, for example, multi-factor authentication, device registration, self-service password management, self-service group management, privileged account management, role based access control, application usage monitoring, security auditing, security monitoring, alerting, and the like, or any combination thereof.

In some configurations, the SSO server 230 is a cloud multi-tenant active directory, such as Azure® Active Directory. In other configurations, the SSO server 230 may be realized as a LDAP directory or any other directory that manages groups and roles authorized to access the SPA 215.

According to the disclosed embodiments, the authentication gateway 240 is communicatively connected between the datacenters 210 and the client devices 220. The gateway 240 may be deployed inside or outside a cloud-computing platform as an in-line or out-of-path deployment. The authentication gateway 240 is also communicatively connected to the SSO server 230. In certain configurations, the authentication gateway 240 may be integrated in the SSO server 230.

In an embodiment, the authentication gateway 240 is configured to receive login requests to the SPA 215 from the client devices 220. Such requests do not include or designate a specific datacenter 210 to which requests are directed. A request would be typically addressed to a global URL (or any other network address) of a SPA 215. For example, the global URL may be portal.myapp.com, which does not designate a specific datacenter's 210 address. In some configurations, such a global URL may be suffixed with the network address of the authentication gateway 240, for example, portal.myapp.com/auth_gateway.

Upon receiving a login request from a client device (e.g., the client device 220-1), the authentication gateway 240 is further configured to authenticate the user of the client device. The authentication is performed using the SSO server 230. To this end, the authentication gateway 240 is configured to redirect the received login to the SSO server 230 and, upon successful authentication, to receive a token (e.g., an access token) from the SSO server 230. The SSO server 230 and gateway 240 may communicate using, for example, a security assertion markup language (SAML) protocol.

In an embodiment, the received token includes information designating a tenant that the authenticated user belongs to. The token may also include credentials for a login session, a user's identifiers, the user's groups, the user's privileges, and the like. The information designating a tenant may include a unique tenant ID, a user name, or any other type of identifier that uniquely identifies a user with a tenant. The information designating a tenant is referred to hereinafter as a "tenant ID" or "tenant IDs". The authentication gateway 240 is further configured to determine one of the datacenters 210 executing an instance of the SPA 215 supporting a tenant designated by the tenant ID. In an embodiment, the determination is performed by querying each of the datacenters 210 using the tenant ID (included in the received token). The query may be submitted through an API.

In another embodiment, the authentication gateway 240 is configured to maintain a table mapping between tenant IDs and the datacenters 210. The information in such a table can be provided by the datacenters 210 (e.g., by frequently pushing the tenant IDs information to the gateway 240 or frequently pulling the tenant IDs information to the datacenters 210). In another embodiment, the authentication gateway 240 is configured to learn the mapping between datacenters and tenant ID information over time. For example, any datacenter 210 determined to handle tenant ID(s) is logged in the table.

It should be appreciated that determining an association between a tenant ID and one of the datacenters 210 can be performed using any of the above-noted embodiments, or a combination thereof. For example, the gateway 240 may first check its table to identify if there is an entry of a received tenant ID and, if not, query the datacenters 210.

Upon determination of a datacenter (e.g., the datacenter 210-1) handling the tenant designated by the tenant ID, the authentication gateway 240 is configured to retrieve a web page from the determined datacenter 210-1. The retrieved web page contains references to all resources for accessing an instance of the SPA 215 hosted in the determined datacenter 210-1. In an example embodiment, such resources include, for example, JavaScript, images, CSS files, or any other HTML elements pointing to the SPA 215 hosted in the determined datacenter 210-1.

The retrieved web page is served directly to the client device (e.g., the client device 220-1) that communicates directly with the instance of the SPA 215 hosted in the determined datacenter 210-1. Thus, the authentication gateway 240 does not force a URL redirect or proxy traffic between the client device 220-1 and the determined datacenter 210-1.

Following is a non-limiting example for the operation of the authentication gateway 240. A login request is received from the client device 220-1 to access a SPA addressed by the URL "https://portal.myapp.com". Upon authentication of a user of the client device 220-1, the SSO server 230 returns a token with a tenant ID '2703' designating a tenant that the authenticated user belongs to.

The gateway 240 determines that the tenant having a tenant ID '2703' is hosted in the datacenter 210-1 which, in this example, is located in the United States. The gateway 240 retrieves, from the datacenter 210-1, a web page of the "myapp" application hosted in the datacenter 210-1. The retrieved web page may include the following example HTML code:

```
<html lang="en">
<head>
    <script type="text/javascript">var __USER = 'user@user.com';
    var __TENANT_ID = 2703;
    var FULL__LOCALE = 'en-US';
    var SERVER_URL = 'https://portal.us.myapp.com';
    var USING__GATEWAY = false;
    </script>
    <script type="text/javascript" src="https://portal.us.myapp.com/en-US.js?cachebust=0.90.57">
    </script>
    <link rel="stylesheet" href="https://portal.us.myapp.com/cas/static/css/vendor-2bc80f08.css?cachebust=0.90.57">
    <link rel="icon" type="image/x-icon" href="https://portal.us.cloud-service-27.com/cloud-service-27/static/images/cloud-service-27_favicon.ico">
</head>
<body>
    <script src="https://portal.us.myapp.com/cloud-service-27/static/js/utilse547f.js?cachebust=0.90.57">
    </script>
    <link rel="stylesheet" type="text/css" href="https://portal.us.myapp.com/cloud-service-27/static/css/console2.css?cache-bust=14852710">
</body>
</html>
```

As noted in the above example, the HTML elements include script (e.g., JavaScript) and links (stylesheets, CSS, images), pointing to the US address, https://portal.us.myapp.com, of the application (myapp) in the US datacenter 210-1.

Another login request is received from the client device 210-2 to access "https://portal.myapp.com" Upon authentication of a user of the client device 210-2, the SSO server 230 returns a token with a tenant ID '2795' designating a tenant that the authenticated belongs to. The gateway 240 determines that the tenant having a tenant ID '2795' is hosted in the datacenter 210-2 which, in this example, is located in Europe. The gateway 240 retrieves from the datacenter 210-2 a web page of the "myapp" application hosted in the datacenter 210-2. The retrieve web page may include the following example HTML code:

```
<html lang="en">
<head>
    <script type="text/javascript">var __USER = 'user@user.com';
    var __TENANT_ID = 2795;
    var FULL__LOCALE = 'en-US';
    var SERVER_URL = 'https://portal.us.myapp.com';
    var USING__GATEWAY = false;
    </script>
    <script type="text/javascript" src="https://portal.ep.myapp.com/en-US.js?cachebust=0.90.57">
    </script>
    <link rel="stylesheet" href="https://portal.ep.myapp.com/cloud-service-27/static/css/vendor-2bc80f08.css?cachebust=0.90.57">
    <link rel="icon" type="image/x-icon" href="https://portal.ep.cloud-service-27.com/cloud-service-27/static/images/cloud-service-27_favicon.ico">
</head>
<body>
    <script src="https://portal.ep.myapp.com/cloud-service-27/static/js/utilse547f.js?cachebust=0.90.57">
    </script>
    <link rel="stylesheet" type="text/css" href="https://portal.ep.myapp.com/cloud-service-27/static/css/console2.css?cache-bust=14852710">
</body>
</html>
```

In this example, the HTML elements point to the European address, https://portal.ep.myapp.com, of the application (myapp) in the US datacenter 210-2.

It should be appreciated that, upon loading the example web pages on the respective browsers of the client devices 220-1 and 220-2, each browser can directly access the URLs referenced in the HTML code. Thus, direct communication is established between the client devices 220-1 and 220-2 and their determined datacenters 210-1 and 210-2, respectively. Again, this is achieved without forcing a URL redirect or forward proxying the traffic from the client devices.

It should be noted that, although one SPA 215 and one server 217 are depicted in FIG. 2B merely for the sake of simplicity, the embodiments disclosed herein can be applied to a plurality of cloud applications executed by a plurality of browsers.

It should be further noted that the embodiments disclosed herein are not limited to the specific architecture illustrated in FIGS. 2A-2B, and that other architectures may be equally used without departing from the scope of the disclosed embodiments. Specifically, in an embodiment, there may be a plurality of authentication gateways 240 operating as described hereinabove and configured to either have one as a standby gateway to take control in a case of failure, to share the load between them, or to split the functions between them. Furthermore, without departing from the scope of the disclosed embodiments, various functions of the gateway 240 may be implemented by the SSO server 230 or various functions of the SSO server 230 may be implemented by the gateway 240.

Figure 3:
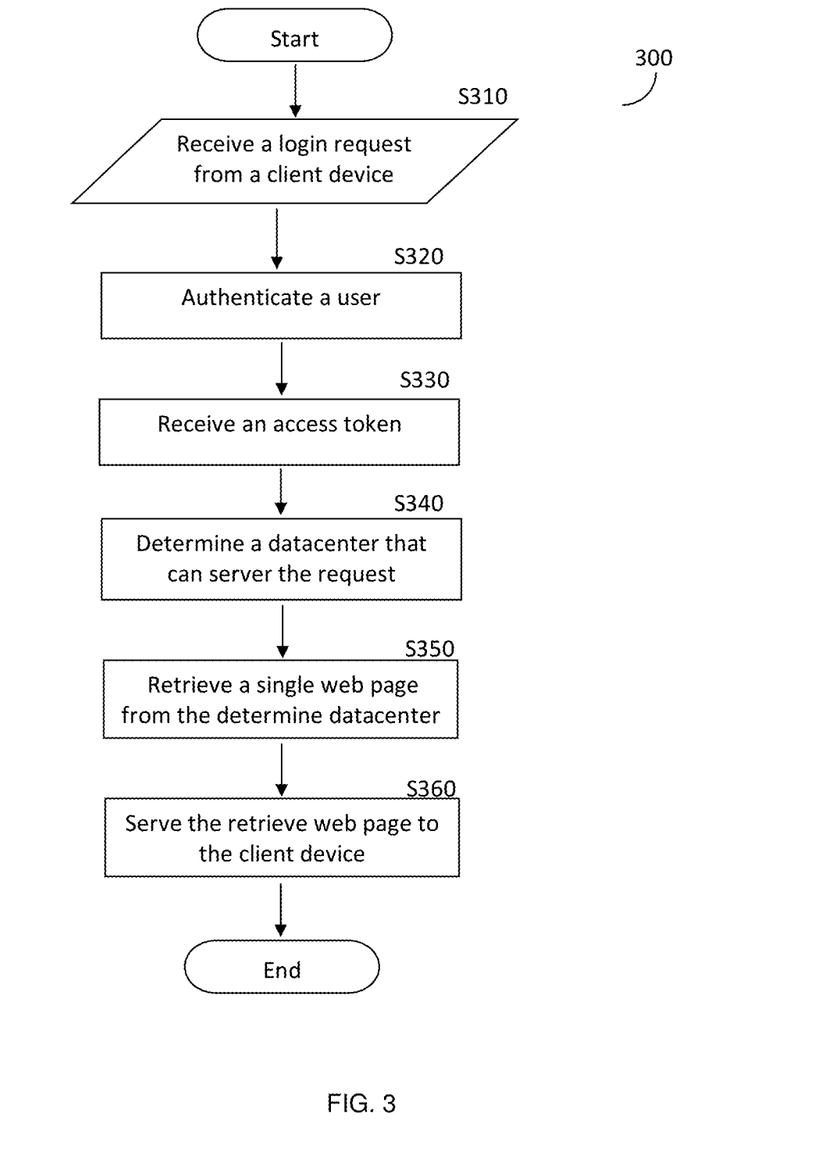
FIG. 3 is a flowchart illustrating a method for single authentication to a multi-tenancy cloud application hosted in multiple different datacenters according to an embodiment.

FIG. 3 depicts an example flowchart 300 illustrating a method for single authentication to a multi-tenancy cloud application hosted in multiple different datacenters according to an embodiment. The method may be performed by the authentication gateway 240.

At S310, a login request to a SPA is received from a client device. The login request is addressed to a global URL associated with the SPA. The request may include the credentials of a user attempting to login.

At S320, the user of the client device is authenticated. This can be performed by means of a SSO server or service, or any other identity management system or service.

At S330, an access token is received in response to the authentication of the user. As noted above, such a token may include tenant identification data, such as at least a tenant ID designating a tenant that the authenticated user belongs to. The token may also include credentials for a login session, a user's identifiers, the user's groups, the user's privileges, and the like. It should be noted that, when the user is not authenticated, an access token is not received. In an embodiment, when the user is not authenticated, an error message is generated and sent to the client device.

At S340, using the tenant ID, a datacenter executing an instance of the SPA supporting a tenant of the (authenticated) logged-in user is determined. In an embodiment, the determination is performed by querying each of the datacenters 210 using the tenant ID (included in the received token). The query may be submitted through an API. As an example, the following is example code demonstrating an API to query a datacenter:

```
HTTP POST to https://cpanel.us.myapp.com/api/authgateway/tenant_info/
With the following body:
{
  "contextId": 12345435
}
```

The 'contextId' parameter is set to the value of the tenant ID designated in the received access token. It should be noted that any datacenter that may host a respective tenant is queried.

In another embodiment, the datacenter is determined using a table maintained, for example, in the authentication gateway or any other device accessed by the gateway. As noted above, such a table includes mapping information between tenant identifying data (e.g., tenant IDs) and datacenters. The information in such a table can be provided by the datacenters or learned over time.

At S350, the determined datacenter is accessed and a web page of the cloud application to be accessed is retrieved. The retrieved web page includes resources (e.g., HTML elements) pointing to a location of the cloud application's instance in the determined datacenter. Examples for such web pages are provided above.

At S360, the retrieved web page is directly served to the client device (i.e., the client device initiating the request at S310). As a result, the client device is allowed to directly access and communicate with the cloud application in a datacenter hosting its tenant.

Figure 4:
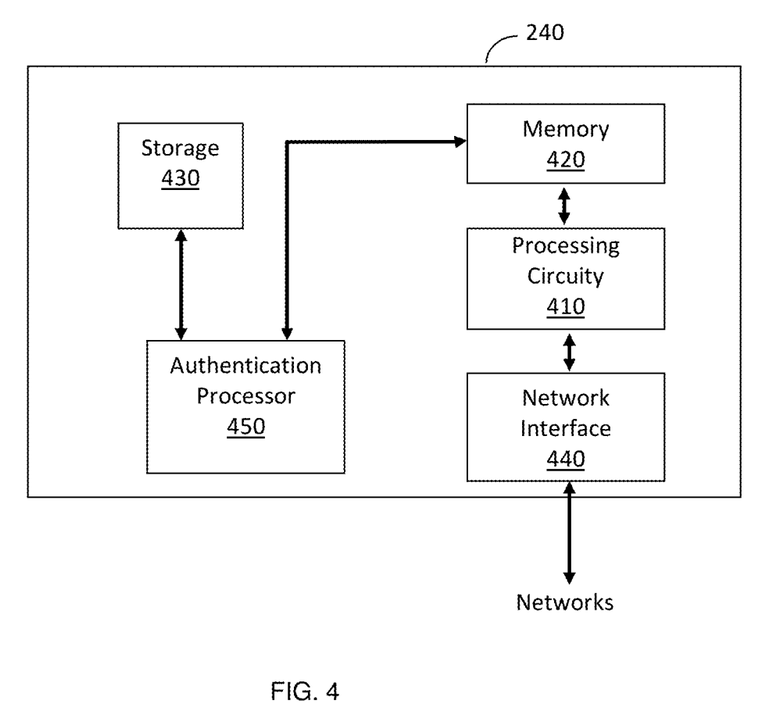
FIG. 4 is a block diagram of an authentication gateway constructed according to an embodiment.

FIG. 4 shows an example block diagram of the authentication gateway 240 constructed according to an embodiment. The authentication gateway 240 may be deployed in cloud-computing platforms, data centers, or as a stand-alone network device. The authentication gateway 240 is configured to at least provide single authentication to a multi-tenancy cloud application hosted in multiple different datacenters as described in greater detail above. The authentication gateway 240 includes a processing circuitry 410 coupled to a memory 420, a storage 430, a network interface 440, and an authentication processor 450.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory 420 may be volatile (e.g., RAM, etc.), non-volatile (e.g., ROM, flash memory, etc.), or a combination thereof.

The storage 430 may be magnetic storage, optical storage, and the like and may be realized, for example, as flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information.

In one configuration, computer readable instructions to implement one or more embodiments disclosed herein may be stored in the storage 430. The storage 430 may also store other computer readable instructions to implement an operating system, an application program, and the like. Computer readable instructions may be loaded in the memory 420 for execution by the processing circuitry 410. The storage 430 is configured to store, for example, access policies, client certificates, authentication tokens, device postures of client devices, device history, user account history, and other information that can be for authentication.

In another embodiment, the storage 430, the memory 415, or both are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various functions described herein.

The network interface 440 allows the authentication gateway 240 to communicate with other external devices. For example, the interface 440 is configured to allow the gateway 240 to communicate with a SSO server (e.g., the server 230), datacenters executing the cloud application, servers executing the cloud application, or a combination thereof.

In an embodiment, the network interface 440 allows remote access for the gateway 240 for the purpose of, for example, configuration, reporting, and the like. Such a connection, in an embodiment, can be realized through a web portal. The network interface 440 may include a wired connection or a wireless connection. The network interface 440 may transmit communication media, receive communication media, or both. For example, the network interface 440 may include a modem, a network interface card (NIC), an integrated network interface, a radio frequency transmitter/receiver, an infrared port, a USB connection, and the like.

The authentication processor 450 is configured to perform the process for single authentication to a multi-tenancy cloud application hosted in multiple different datacenters described herein. The process is discussed in greater detail above. In an embodiment, the authentication processor 450 is further configured to maintain a table for mapping tenant IDs to datacenters hosting their respective tenants.

In an embodiment, the query processor 450 can be realized by one or more hardware logic components and circuits. For example, and without limitation, illustrative types of hardware logic components that can be used include FPGAs, ASICs, ASSPs, SOCs, CPLDs, general-purpose microprocessors, DSPs, and the like, or any other hardware logic components that can perform calculations or other manipulations of information.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be loaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for single authentication to a multi-tenancy single-page application hosted in a plurality of different datacenters, comprising:
   receiving, from a client device, a login request to access the single-page application;
   receiving an access token in response to an authentication of a user of the client device, wherein the access token designates at least tenant identification data;
   determining a datacenter of the plurality of different datacenters executing an instance of the single-page application supporting a tenant of the authenticated user, wherein determining datacenter of the plurality of different datacenters includes querying each of the plurality of different datacenters using a tenant identifier designated in the request;
   retrieving, by an authentication gateway and from the determined datacenter, a single web page of the single-page application, wherein the retrieved single web page includes at least references to resources pointing to a location of the determined datacenter, wherein the authentication gateway connected between the client device and the plurality of different datacenters; and
   serving the single web page to the client device.

2. The method of claim 1, further comprising:
   causing a single-sign-on (SSO) server to authenticate the user; and
   receiving, from the SSO server, the access token.

3. The method of claim 1, wherein the tenant identification data includes at least any one of: a tenant identifier (ID) and a user name.

4. The method of claim 1, wherein determining the datacenter executing the instance of the single-page application further comprising:
   querying, using the designated tenant identification data, a table mapping between tenant identification data and datacenters.

5. The method of claim 4, further comprising:
   pulling mapping information maintained by the table from the plurality of different datacenters.

6. The method of claim 4, further comprising:
   learning mapping information maintained by the table over time.

7. The method of claim 1, wherein the resources include at least one hypertext markup language (HTML) element.

8. The method of claim 1, wherein serving the single web page to the client device further comprises:
causing the client device to directly communicate with the determined datacenter.

9. The method of claim 1, wherein the single-page application provides functionality of any one of: a cloud application and a web application.

10. A non-transitory computer readable medium having stored thereon instructions for causing a processing circuitry to execute a process, the process comprising:
   receiving, from a client device, a login request to access the single-page application;
   receiving an access token in response to an authentication of a user of the client device, wherein the access token designates at least tenant identification data;
   determining a datacenter of the plurality of different datacenters executing an instance of the single-page application supporting a tenant of the authenticated user, wherein determining datacenter of the plurality of different datacenters includes querying each of the plurality of different datacenters using a tenant identifier designated in the request;
   retrieving, by an authentication gateway and from the determined datacenter, a single web page of the single-page application, wherein the retrieved single web page includes at least references to resources pointing to a location of the determined datacenter, wherein the authentication gateway connected between the client device and the plurality of different datacenters; and
   serving the single web page to the client device.

11. A system for single authentication to a multi-tenancy single-page application hosted in a plurality of different datacenters, comprising:
   a processing circuitry; and
   a memory, the memory containing instructions that, when executed by the processing circuitry, configure the system to:
   receive, from a client device, a login request to access the single-page application;
   receive an access token in response to an authentication of a user of the client device, wherein the access token designates at least tenant identification data;
   determine a datacenter of the plurality of different datacenters executing an instance of the single-page application supporting a tenant of the authenticated user by querying each of the plurality of different datacenters using a tenant identifier designated in the request;
   retrieve, from the determined datacenter, a single web page of the single-page application, wherein the retrieved single web page includes at least references to resources pointing to a location of the determined datacenter, wherein the system is connected between the client device and the plurality of different datacenters; and
   serve the single web page to the client device.

12. The system of claim 11, wherein the system is further configured to:
   cause a single-sign-on (SSO) server to authenticate the user; and
   receive, from the SSO server, the access token.

13. The system of claim 11, wherein the tenant identification data includes at least any one of: a tenant identifier (ID) and a user name.

14. The system of claim 11, wherein the system is further configured to:
   query, using the designated tenant identification data, a table mapping between tenant identification data and datacenters.

15. The system of claim 14, wherein the system is further configured to:
   pull mapping information maintained by the table from the plurality of different datacenters.

16. The system of claim 14, wherein the system is further configured to:
   learn mapping information maintained by the table over time.

17. The system of claim 11, wherein the resources include at least one hypertext markup language (HTML) element.

18. The system of claim 11, wherein the system is further configured to:
   cause the client device to directly communicate with the determined datacenter.

19. The system of claim 11, wherein the single-page application provides functionality of any one of: a cloud application and a web application.

\* \* \* \* \*